United States Patent [19]

Henning et al.

[11] Patent Number: 4,846,892
[45] Date of Patent: Jul. 11, 1989

[54] TETRACHLOROPERYLENE-3,4,9,10-TETRACARBOXYLIC ACID DIIMIDE PIGMENT AND ITS USE

[75] Inventors: Georg Henning, Ludwigshafen; Erwin Hahn, Heidelberg; Peter Hauser, Limburgerhof; Manfred Patsch, Wachenheim, all of Fed. Rep. of Germany

[73] Assignee: BASF Aktiengesellschaft, Ludwigshafen, Fed. Rep. of Germany

[21] Appl. No.: 92,600

[22] Filed: Sep. 3, 1987

[30] Foreign Application Priority Data

Sep. 18, 1986 [DE] Fed. Rep. of Germany ....... 3631678

[51] Int. Cl.$^4$ .............................................. C08K 5/34
[52] U.S. Cl. ...................................... 106/478; 546/37
[58] Field of Search .............. 546/37; 106/288 Q, 498

[56] References Cited

U.S. PATENT DOCUMENTS 4,431,806  2/1984  Spietschka et al. .............. 106/288 Q
4,492,648  1/1985  Claussen ................................ 546/37

*Primary Examiner*—Paul Lieberman
*Assistant Examiner*—Christine A. Skane

*Attorney, Agent, or Firm*—Oblon, Spivak, McClelland, Maier & Neustadt

[57] ABSTRACT

A tetrachloroperylene-3,4,9,10-tetracarboxylic acid diimide pigment which contains not less than 85% by weight of the tetrachloro compound of the formula

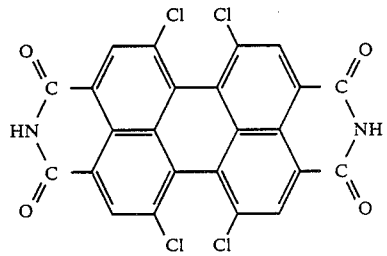

which is present to the extent of not less than 95% by weight in the β-modification and which, in an X-ray spectrum, exhibits 2Θ CuK$_\alpha$ main lines at 9.0°, 13.3°, 15.0°, 16.8°, 19.1°, 21.5°, 24.2°, 25.4°, 26.5°, 27.0° and 27.5°.

In finishes, the pigment gives very brilliant colorations which are very highly lightfast and fast to weathering and which, upon weathering, neither bleach nor darken up.

7 Claims, No Drawings

TETRACHLOROPERYLENE-3,4,9,10-TETRACARBOXYLIC ACID DIIMIDE PIGMENT AND ITS USE

German Pat. No. 441,587 describes a process for the preparation of halogenation products of perylenetetracarboxylic acid diimide and its derivatives, wherein the chlorination of the perylenetetracarboxylic acid diimide is performed in chlorosulfonic acid in the presence of iodine, by passing chlorine gas into the mixture. The tetrachloro compound described in the said patent was used as a vat dye and identified as such by its change of hue on soaping. Use of the product as a pigment is not disclosed and indeed only very dull dark brownish red hues with poor lightfastness and weathering fastness are obtained when the compound is used as a pigment. Investigations by X-rays show that the compound is the α-modification.

German Published Application DOS 2,519,790 describes a chlorination process in which aromatic iodine compounds are used as catalysts. For instance, in Example 7 perylene-3,4,9,10-tetracarboxylic acid diimide is reacted with chlorine in the presence of iodobenzene in sulfuric acid. This gives a dichloro product which when used in a paint produces dark colorations.

According to EP-A 81,766, which discloses light-collecting systems using tetrahalogenated and pentahalogenated perylenetetracarboxylic acid diimides as light converters, both a 1,6,7,12-tetrachloroperylene- and a 2,5,8,11-tetrachloroperylene-3,4,9,10-tetracarboxylic acid diimide can, according to the formulae given, be considered for this purpose. In the examples, however, the imides with unsubstituted imide groups are not referred to, which is understandable in view of the use of the imides described, since only dissolved dyes are effective as light converters and tetrachloroperylenecarboxylic acid diimides are insoluble in the media employed for this purpose.

Japanese Published Application 21,429/1969 discloses the condensation of non-halogenated and halogenated naphthalimide to give perylenetetracarboxylic acid diimides which may contain up to 4 halogen atoms. In Example 2, 3,5-dichloronaphthalimide is subjected to condensation, general experience being that the 1,6,7,12-tetrachloro product is not obtained.

German Published Application DOS 3,018,006 describes a process for the preparation of pigments of the perylene-3,4,9,10-tetracarboxylic acid diimide series, and the use of these. The product obtained according to the invention of this publication, by converting the pigment to the sulfate and hydrolyzing the latter to give the pure pigment, are distinguished by extreme transparency and color strength and are therefore proposed especially for metallic finishes. The pigment which is obtained according to Example 6 and which contains 23.5% of chlorine is especially suitable for this application. In contrast, when this pigment is used in full shade finishes it gives relatively dull red hues having only moderate lightfastness and fastness to weathering. According to the chlorine content of 23.5%, which is clearly too low when compared with the 26.9% content of the pure tetrachloro compound, this pigment must consist of a mixture of compounds of different degrees of chlorination, and the tinctorial properties and other performance characteristics (fastness properties) reflect the properties of this mixture. In an X-ray diagram this pigment shows, in addition to the lines of the β-modification, extraneous lines which substantiate the presence of other crystal structures in the mixture.

It is an object of the present invention to provide a perylenetetracarboxylic acid diimide pigment which gives extremely lightfast and weathering-fast, brilliant red colorations.

We have found that this object is achieved by a tetrachloroperylene-3,4,9,10-tetracarboxylic acid diimide pigment which contains not less than 85% by weight of the tetrachloro compound of the formula

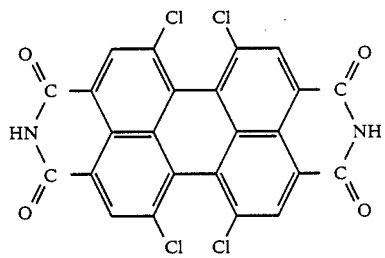

which is present to the extent of not less than 95% by weight in the β-modification and which, in an X-ray spectrum, exhibits $2\ominus CuK_\alpha$ main lines at 9.0, 13.3, 15.0, 16.8, 19.1, 21.5, 24.2, 25.4, 26.5, 27.0 and 27.5°.

In a finish, the novel pigment gives very brilliant red colorations, such as are not attainable with pigment mixtures of compounds of different degrees of chlorination and/or mixtures of modifications. Further, the colorations produced with the novel pigment exhibit very high lightfastness and fastness to weathering. Even after very long light exposure and weathering neither bleaching nor darkening occurs. In contrast, full shade finishes containing mixtures of perylenediimides of different degrees of chlorination darken up considerably on weathering, while white reductions bleach relatively rapidly. An analogous effect - poor lightfastness and fastness to weathering, for example severe darkening up - occurs when the pigment consists of a mixture of a β- and α-modification.

Since the α-modification is mostly present in a form which is not well crystallized, it can, under certain circumstances, no longer be detected in the X-ray diagram, and hence no longer be discerned, while its content is still as much as about 10%. However, it can be detected by an indirect process in which the sample is suspended for several days in xylene at room temperature. Hereupon, the α-constituents crystallize to give a xylene adduct which exhibits a different structure and a characteristic X-ray diagram and can be identified under the microscope because of the particles having increased markedly in size. An analogous reaction does not occur with the β-modification. The hiding power of the novel pigment, a particularly important consideration in full shade paints, exhibits a maximum particle size of 0.3–0.5 μm, while the color strength, which is particularly important in white reduction paints and in metallics, only comes into full play with decreasing particle size.

The 1,6,7,12-tetrachloro-3,4,9,10-tetracarboxylic acid diimide is prepared in a manner known per se by passing chlorine into a solution of the 3,4,9,10-tetracarboxylic acid diimide in concentrated sulfuric acid. The chlorination takes place at from 25° to 40° C. The amount of 98–100% strength by weight sulfuric acid is 8–13, preferably 10–13, the amount by weight of the diimide to be chlorinated. The halogenation is advantageously carried out using an alkali metal iodide, for example sodium iodide, as the catalyst, the amount which sublimes off or is consumed during the chlorination being replaced by repeated fresh addition of NaI. The end point of the chlorination is advantageously determined by measuring the total chlorine content of the product on a sample. The chlorination end point is reached at 26.7–27.1% by weight of chlorine. Water is then introduced into the resulting tetrachlorodiimide solution, taking care not to produce any sulfate intermediate stages. This is achieved if, before chlorination, the weight ratio of perylimide to sulfuric acid was about 1:13, the temperature on precipitation does not fall below 20° C. and, during dilution, the range from 90 to 82% strength by weight sulfuric acid is passed through as rapidly as possible, by adding water rapidly, with good mixing and intensive cooling. At the end, the sulfuric acid concentration should be about 79–82% by weight, preferably 81% by weight (based on the sulfuric acid phase0. At precipitation temperatures of from 20° to 40° C., preferably from 25° to 35° C., the pigment is obtained in a very finely divided form and already in the β-modification. By heating the mixture to 90°–120° C., this material can be recrystallized until the particle size is 0.15–0.5 μm. The product is then filtered off and the residue is washed first with 82% strength sulfuric acid and then with water.

If, during precipitation, the mixture is warmed to above 40° C., especially to 50°–70° C., the βmodification of (I) is obtained in the form of large particles. These can be converted to tinctorially valuable pigment forms by comminution and recrystallization.

To determine the end point of the chlorination, a sample of the reaction mixture is poured out into ice water and the precipitate is filtered off, washed neutral and dried. The content of chlorine in the product thus obtained is determined. According to analysis, the chloroperylenetetracarboxylic acid diimide obtained by complete precipitation contains 75–925 by weight of the 1,6,7,12-tetrachloro compound. In contrast, the pigments according to the invention obtained by fractionation contain not less than 85, especially not less than 89, % by weight of 1,6,7,12-tetrachloroperylenetetracarboxylic acid diimide.

The content of 1,6,7,12-tetrachloro compound can be determined by HPLC analysis.

To prepare the finely divided deeply colored form of the novel pigment, with a particle size of less than 0.3 μm, the βmodification is precipitated and the suspension is only warmed to 50°–90° C. and stirred at this temperature for one to two hours.

Another possible way of preparing the novel pigment is to isolate the particles obtained in the βmodification during the pigment precipitation described above and recrystallization them in 80–83% strength by weight sulfuric acid, either directly or after comminution, depending on the particle size.

The Examples which follow illustrate the invention. Percentages are by weight.

EXAMPLE 1

50 g of perylene-3,4,9,10-tetracarboxylic acid diimide are dissolved in 640 g of 100% strength sulfuric acid at room temperature. 0.9 g of NaI is now added and 84 g of chlorine are passed in at 30° C. over 9 hours. After 3 and 6 hours respectively, a further 0.9 g of NaI is added. After completion of the chlorination, 160 g of water (at 25° C.) are added dropwise over 10 minutes while keeping the mixture at 30° C., with good cooling. The mixture obtained is then heated to 120° C. and stirred at this temperature for 3 hours. The suspension is allowed to cool to 60° C., and the pigment is filtered off and washed with a total of 170 g of 80% strength sulfuric acid, used a little at a time. It is then washed neutral with water and dried at 80° C.

Yield: 63 g of tetrachloroperylimide containing 26.9% of chlorine. Content of 1,6,7,12-tetrachloro-3,4,9,10-tetracarboxylic acid diimide: 95.2% (determined by HPLC analysis in tetrahydrofuran on a Latek column, 250×4 C 18 GO/R5 μm, with UV detector at 513 nm).

According to X-ray analysis, the product is present only in the βmodification; mean particle size 0.35 μm.

EXAMPLE 2

50 g of perylenetetracarboxylic acid diimide are dissolved in 640 g of 100% sulfuric acid at room temperature. After 0.9 g of NaI has been added, 30 g of chlorine are passed in over 3 hours at 30° C. A further 0.9 g of NaI is then added, after which 30 g of chlorine are passed in over 3 hours. A further 1 g of NaI is then added, after which 30 g of chlorine are passed in over 4 hours. Thereafter, a sample is taken from the batch, precipitated in ice water and filtered, and the product is washed with water and dried. This sample has a total chlorine content of 27.0% and according to HPLC analysis contains 77.0% of the 1,6,7,12-tetrachloro compound. 160 g of water are now added, over 15 minutes, to the chlorination mixture, with good cooling and rapid stirring, after which the batch is heated to 120° C. and kept at this temperature for 3 hours. It is then cooled to 50° C. and the product is filtered off, washed in portions with a total of 180 g of 80% strength sulfuric acid and finally washed neutral with water. After drying, 62 g of the tetrachloroperylimide pigment, containing 89% of the 1,6,7,12-tetrachloro compound, are obtained. The pigment is present exclusively in the βmodification and has a mean particle size of 0.4 μm.

EXAMPLE 3

50 g of perylene-3,4,9,10-tetracarboxylic acid diimide are chlorinated as in Example 1.

After completion of the chlorination, 160 g of water (at 25° C.) are added over 10 minutes to the mixture at 30° C., with intensive cooling. The mixture is then heated to 40° C. and stirred at this temperature for 1 hour, after which it is heated to 70° C. and kept at this temperature for 1 hour. The suspension is suction-filtered and the product is washed with 170 g of 80% strength sulfuric acid, used in portions. The pigment is then washed neutral with water and dried at 80° C.

Yield: 61 g of tetrachloroperylimide, having the same purity as that obtained according to Example 1. Mean particle size 0.1 μm.

EXAMPLE 4

(4.1)

50 g of perylene-3,4,9,10-tetracarboxylic acid diimide are chlorinated as in Example 1.

After completion of the chlorination, 160 g of water (at 25° C.) are added dropwise to the mixture at 70° C. over 30 minutes. The stirring is then continued for 1 hour. The suspension is suction-filtered and the product is washed with a total of 170 g of 80% strength sulfuric acid, used in portions. The pigment is then washed neutral with water and dried at 80° C.

Yield: 62 g of tetrachloroperylimide. The product consists of particles of from 0.5 to 2.0 μm.

(4.2)

40 g of the tetrachloroperylimide obtained are milled in a 500 ml agate cup in a planetary mill for 8 hours and the balls are then removed on a sieve.

(4.3)

30 g of the milled material are introduced into 300 g of 80% strength sulfuric acid and the mixture is heated to 120° C. and stirred at this temperature for 3 hours. The batch is allowed to cool to 60° C. and the pigment is filtered off with suction and washed with 60 g of 80% strength sulfuric acid. It is then washed neutral with water and dried at 80° C.

Yield: 27.5 g of tetrachloroperylenetetracarboxylic acid diimide of particle size of about 0.2 μm.

USE EXAMPLE 1

10% full shade baking finish (a) Full shade paste (30% strength)

3 parts of the colorant of Example 1 and 7 parts of a varnish-type binder (eg. Grinding Base 100S from Lawter Chemicals Inc., Chicago) are processed on a triple roll mill, with 6 passes at 10 bar, to give a full shade paste.

(b) Full shade finish paste (10% strength), used for the coloring process 2 parts of full shade pate from a) are mixed with 4 parts of a binder mixture consisting of 1 part of an alkyd resin modified with soybean oil, 2 parts of a alkyd resin modified with synthetic fatty acid and 3 parts of a solventfree melamine resin.

(c) Coloration process

The paste from (b) is applied, with a film spreader, in a thickness of 100 μm, to cardboard on which black bars have been printed, and is baked for 45 minutes at 120° C. in a drying oven. A high-hiding brilliant red coloration having excellent lightfastness and weathering fastness is obtained.

USE EXAMPLE 2

Baking finish reduced 1:20

(a) White paste (30% strength)

42 parts of a binder obtained by mixing 1 part of an alkyd resin modified with soybean oil and 2 parts of an alkyd resin modified with synthetic fatty acid are miled with 30 parts of titanium dioxide (rutile grade), 22 parts of a solvent-free melamine resin and 6 parts of a colloidal silicon dioxide on a triple roll mill at 10 bar, using 6 passes, to give a 30% strength white paste. b) Pste used for the coloring process 0.5 part of the 30% strength full shade paste according to 1(a), but prepared using 3 parts of the pigment of Example 3 instead of 3 parts of the colorant of Example 1, and 10 parts of 30% strength white paste according to (a) are mixed and milled on a disk mill.

(c) Coloration process

Using a film spreader, the paste (b) is applied in a thickness of 100 μm onto cardboard and is baked for 45 minutes at 120° C. in a drying oven. An intensely colored, brilliant red coloration having very good lightfastness and weathering fastness is obtained.

USE EXAMPLE 3

Plasticized PVC (0.1% strength coloration)

0.05 part of colorant obtained according to Example 2 and 50 parts of a blend of 65 parts of PVC powder, 36 parts of di-ethylhexyl phthalate and 2 parts of dibutyltin bis-hexyl-thioglycolate are homogenized for about 8 minutes on a mixing mill at 150° C.–160° C., hides are taken from the mill and these are polished on a calender. Brilliant, opaque red hides having excellent lightfastness are obtained.

USE EXAMPLE 4

Polyethylene (0.05% strength coloration)

0.05 part of colorant obtained according to Example 1 is dry-blended with 100 parts of polyethylene powder (high pressure material) in a drum blender. The mixture is melted and homogenized on a screw extruder at a barrel temperature of from 160° to 200° C. The colored plastic mass is granulated by die-face cutting or by drawing strands and cooling these. The granules thus obtained are then used to produce moldings on an injection molding machine at 200° C. or are compression-molded on presses into any desired shape. Opaque luminous red pressings having high lightfastness are obtained.

USE EXAMPLE 5

Polyethylene 1:10 (blend)

0.1 part of the colorant of Example 4 is blended with 100 parts of polyethylene powder (high pressure material) and 1 part of titanium dioxide (rutile grade), as described in Example 4, and the product is converted to moldings. These are intensely red and have good lightfastness.

We claim:

1. A tetrachloroperylene-3,4,9,10-tetracarboxylic acid diimide pigment which contains not less than 85% by weight of the tetrachloro compound of the formula

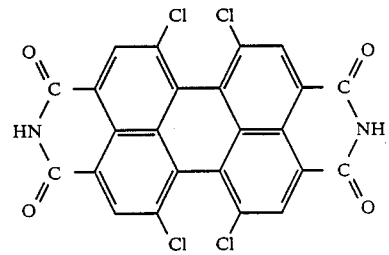

which is present to the extent of not less than 95% by weight in the β modification and which, in an X-ray spectrum, exhibits 2⊖ CuK$_α$ main lines at 9.0, 13.3, 15.0, 16.8, 19.1, 21.5, 24.2, 25.4, 26.5, 27.0 and 27.5°.

2. The tetrachloroperylene-3,4,9,10-tetracarboxylic acid diimide pigment as claimed in claim 1, which contains not more than 15% by weight of diimide with more than 4 chlorine atoms and diimide with 2 and 3 chlorine atoms, the content of diimide with more than 4 chlorine atoms bing at most 12% by weight.

3. The tetrachloroperylene-3,4,9,10-tetracarboxylic acid diimide pigment as claimed in claim 1, which has a means particle size of 0.15–0.5 μm.

4. The tetrachloroperylene-3,4,9,10-tetracarboxylic acid diimide pigment as claimed in claim 2, which has a means particle size of 0.15–0.5 μm.

5. The tetrachloroperylene-3,4,9,10-tetracarboxylic acid diimide pigment as claimed in claim 1, which has a mean particle size of 0.2–0.4 μm.

6. The tetrachloroperylene-3,4,9,10-tetracarboxylic acid diimide pigment as claimed in claim 2, which has a mean particle size of 0.2–0.4 μm.

7. The tetrachloroperylene-3,4,9,10-tetracarboxylic acid diimide pigment as claimed in claim 1, wherein the pigment contains not less than 89% by weight of the tetrachloro compound of the formula of claim 1.

* * * * *